May 10, 1955  R. DEIBEL  2,708,130
WINDSHIELD CLEANER JOINT
Filed Nov. 29, 1949
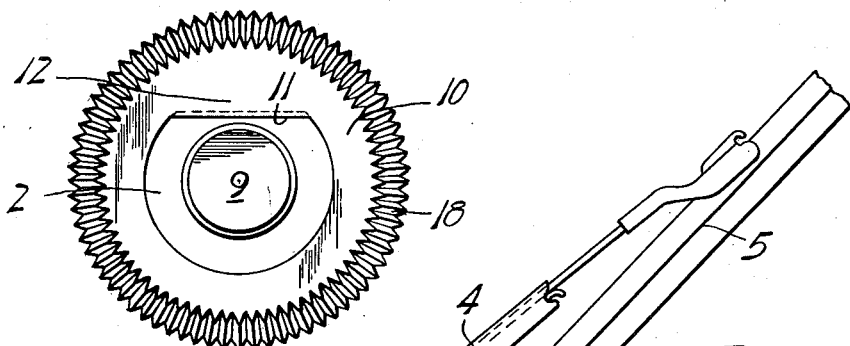
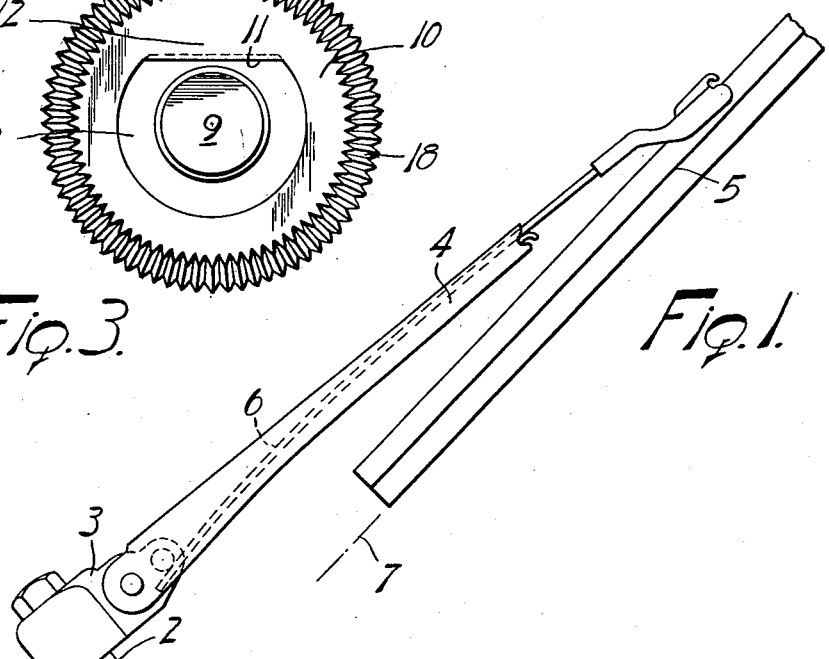
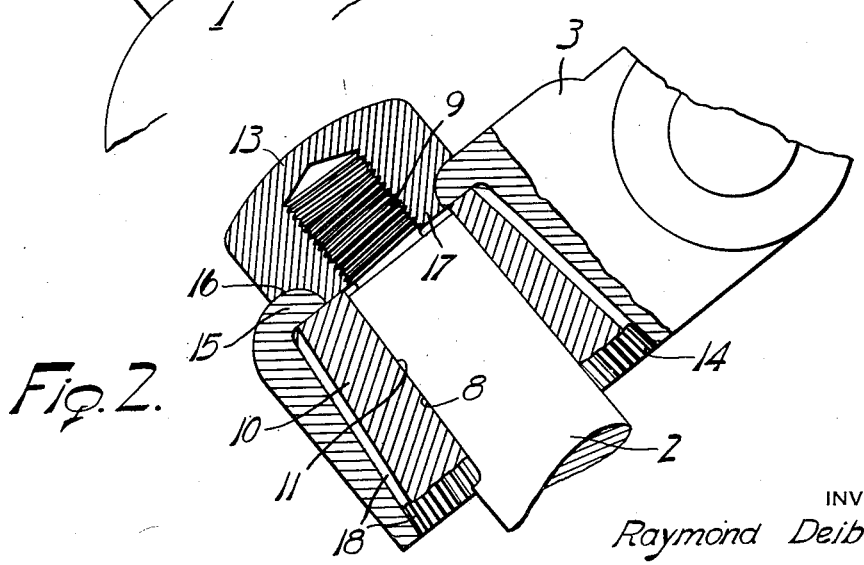
INVENTOR.
Raymond Deibel
BY Bean, Brooks, Buckley & Bean
ATTORNEYS.

United States Patent Office 2,708,130
Patented May 10, 1955

2,708,130
WINDSHIELD CLEANER JOINT

Raymond Deibel, East Aurora, N. Y., assignor to Trico Products Corporation, Buffalo, N. Y.

Application November 29, 1949, Serial No. 130,053

1 Claim. (Cl. 287—53)

This invention relates to the windshield cleaning art and more particularly to the manner of mounting the wiper actuating arm on its drive shaft. The modern windshield cleaner embodies a drive shaft of small diameter to which the wiper carrying arm is fixed for being oscillated thereby over the windshield glass, and when operated at a fast speed that a torque stress of considerable magnitude will be imposed upon this arm connection to the shaft by reason of the inertia of the wiping blade at the extreme outer end of the actuating arm.

The primary object of the present invention is to provide a simple but sturdy connection between the actuating arm and its driving shaft which is practical in design and efficient in use.

A further object of the invention is to provide an economical construction of this nature in which the parts are so designed as to make them readily adapted for quantity production by current die cast methods.

The above and other objects will manifest themselves as the following description progresses, wherein reference is made to the accompanying drawing, in which:

Fig. 1 is a side elevation showing the invention in a practical application;

Fig. 2 is an enlarged fragmentary sectional view more clearly depicting the present invention; and Fig. 3 is an end elevation of the shaft and its drive burr, with the wiper arm omitted.

Referring more particularly to the drawing, the numeral 1 designates a windshield cleaner motor, 2 its power shaft, 3 the wiper carrying arm having a hinged outer section 4, and 5 a wiper blade carried by the outer end of the arm which is urged by a spring 6 toward the windshield surface 7 to provide the desired wiping pressure, all in a well-known manner. Ordinarily the drive shaft 2 is provided with a head having its knurled periphery for interlocking engagement in a cooperating socket in the arm. This head has heretofore been press-fitted onto the shaft and retained in its operative engagement in the socket by a spring latch.

In accordance with the present invention, the mounting of the head has been simplified and the anchorage improved upon to afford a more durable attachment. To this end the shaft which is circular in cross section is formed on one side with a flat face 8 which tapers in an axial direction toward its free end which terminates in a reduced threaded extension 9 of coaxial extent. The head or burr 10 is annular in form and has a central opening conformably fitting the shaft 2 and its tapered flat face 8. Consequently, the inner periphery of this annular member is formed with a flat face 11 likewise tapering toward its outer end. The flat faces 8 and 11 will therefore be chordal while the remaining shaft contacting wall portion of the annular member will be concentric to the major axis of the shaft. This chordal face 11 defines a segmental shaped thrust bearing surface 12 for a cap nut 13 when turned down on the threaded extension 9. This thrust engagement is directly in line with the facial contact with the result that when the nut is screwed down tight, it will react to pull outwardly on the shaft and push inwardly on the annular member and thereby cause the burr face 11 to have firm contact with the face 8 of the shaft 2.

The outer periphery of the annular member 10 is shaped to interlock with the inner wall of a socket 14 in the mounting section of the arm 3. In the illustrated embodiment this interlock is in the form of cooperating ribs and grooves on the coacting surfaces by which the arm may be slidably passed onto the knurled head 10. The socket 14 in the arm is in the form of a through opening so shaped as to permit the threaded end 9 to protrude from the front side of the wiper arm for readily receiving the cap nut 13. The bottom wall of the socket 14 is a part of the front face of the arm and constitutes a rim or inwardly extending flange 15 to overhang and seat upon the outer end of the head 10. This annular flange 15 will in turn be overhung by the outwardly flaring nut 13 for axial thrust contact therewith, as at 16. Therefore, the nut will exert axial thrust upon the arm 3 as well as on the knurled head, the latter thrust being through its axially extending centering lip 17 which fits within the annular flange 15 to afford steadying support for the arm. The outer periphery of the head 10 may taper forwardly toward the nut for being drawn downwardly into the like shaped socket 14 when the nut is tightened.

The head 10 therefore constitutes a key member which has interlocking engagement with the shaft as well as with the wiper arm, the shaft interlock being effected through the tapered faces 8 and 11, while the arm interlock is effected not only through the fitting teeth or ribs 18, but also by reason of the conical shape accorded the outer periphery of the head and the socket.

The mounting section of the arm and also the head 10 are economically manufactured by a die casting process. The metal employed in such process is subject to "cold flow," and therefore when the nut 13 is tightened any expansion of the burr will only tend to cause the malleable material of the head to expand outwardly to bring the ribs 18 into firmer engagement with the cooperating parts of the socket 14 and thereby make the arm mounting on the shaft more durable. Thus, the double interlock will be more secure and binding, and while the foregoing description has been given in detail it is without thought of limitation since the inventive principles involved are capable of assuming other physical embodiments without departing from the spirit of the invention and the scope of the appended claim.

What is claimed is:

A detachable driving mount for an oscillatory wiper arm comprising a shaft body with a reduced threaded end, the body having a generally chordal key face portion tapering toward the threaded end, an annular key member of malleable material having a through opening conformably fitting the body with its tapered face portion and providing a segmental thrust receiving surface at the end of its chordal face, the periphery of the key member tapering in the direction of taper for such face portion of the shaft body, an arm having a tapered through opening conformably fitting the periphery of the key member, and a nut engaged with the reduced threaded end of the shaft and having thrust bearing contact with both the segmental surface of the key member and with the arm to effect firm wedging engagements of the arm and shaft with the inner and outer peripheries of the annular key member.

References Cited in the file of this patent

UNITED STATES PATENTS

| | | |
|---|---|---|
| 981,315 | Rogers | Jan. 10, 1911 |
| 982,403 | Whitton | Jan. 24, 1911 |
| 1,373,345 | Miller | Mar. 29, 1921 |
| 2,146,396 | Horton | Feb. 7, 1939 |
| 2,508,497 | Crocker | May 23, 1950 |

FOREIGN PATENTS

| | | |
|---|---|---|
| 606,143 | France | June 8, 1926 |